UNITED STATES PATENT OFFICE.

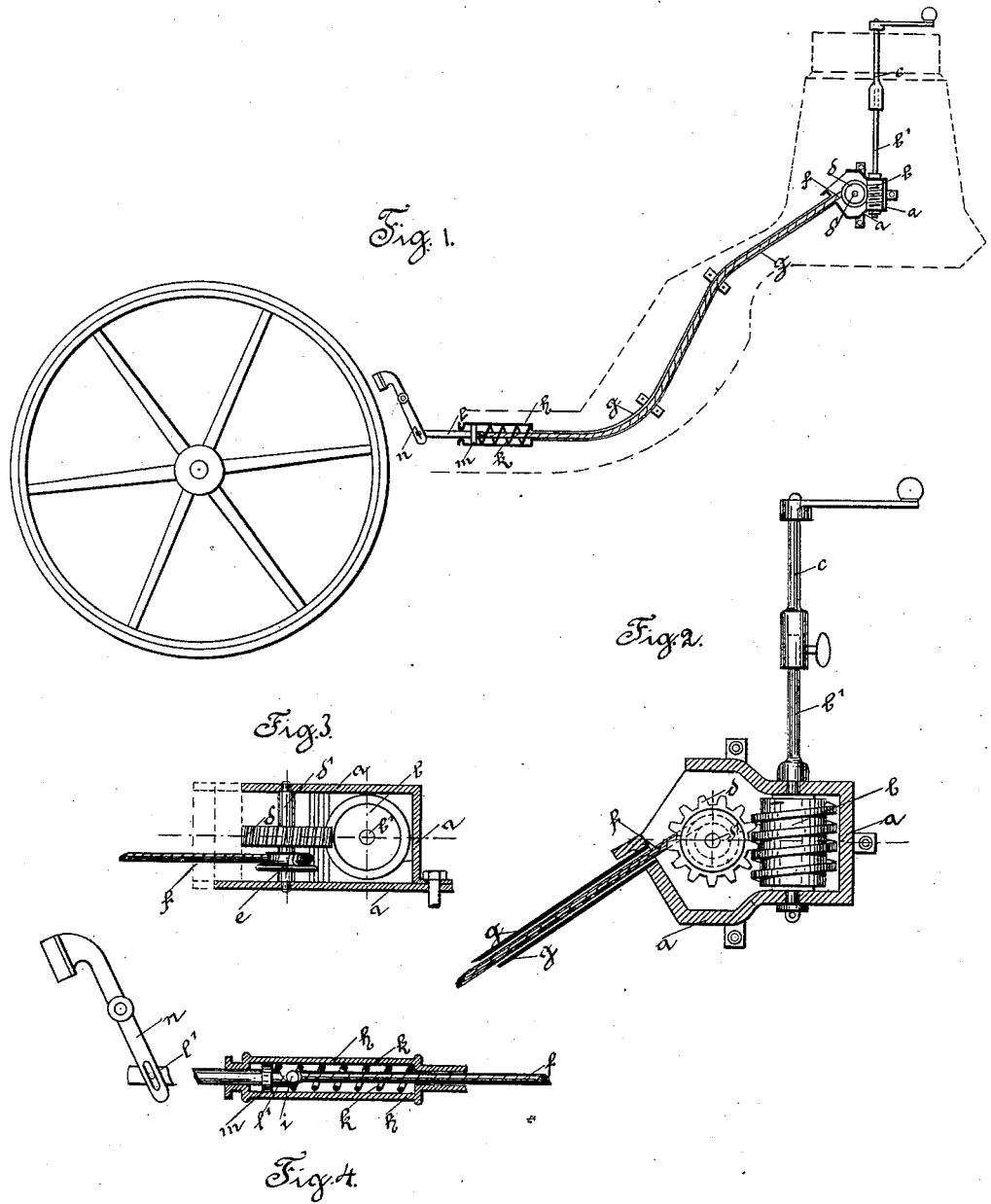

ADOLF KRETZSCHMAR, OF DRESDEN, SAXONY, GERMANY.

BRAKE FOR VEHICLES.

SPECIFICATION forming part of Letters Patent No. 428,725, dated May 27, 1890.

Application filed March 21, 1890. Serial No. 344,850. (No model.) Patented in Germany August 21, 1889, No. 51,040.

*To all whom it may concern:*

Be it known that I, ADOLF KRETZSCHMAR, a subject of the King of Saxony, resident at the city of Dresden, in the Kingdom of Saxony, in the German Empire, have invented certain new and useful Improvements in or Relating to Brakes for Vehicles, (for which I have applied for Letters Patent of Germany No. 51,040, filed August 21, 1889,) of which the following is a specification.

The object of this invention is an arrangement for operating the brake-blocks of vehicles and differs from the well-known contrivances for similar purposes in the following essential features: First, a wire cord is passed through a tube and wound on a barrel, as required, by means of suitable gear operated by worm-gearing, and, second, the whole mechanism is arranged within the carriage.

The operation of the mechanism is as follows: A worm or screw, which is rotated by means of a crank, has in gear with it a worm-wheel mounted upon a shaft, upon which is also secured the wire-cord barrel. This cord, passing through a tube, which may be bent so as to fit the shape of the carriage, is connected at its end with the brake-lever by means of a rod. A collar secured on this rod guides the same within a case or chamber inclosing a spiral spring. This spring is compressed while the brake is applied; but as soon as it is released the expansion of the spring so affects the lever as to cause the same to withdraw the brake-block from the wheel.

The employment of a feed-screw arrangement in the first place permits of the crank-handle being arranged immediately above the driver's box or seat, and also enables the elasticity of springs to be utilized, which the screw-spindles hitherto used did not admit of, inasmuch as they would have required a special device for keeping the spring compressed so long as the brake was desired to act. As to the employment of a wire cord, it enables the whole mechanism to be located within the vehicle, owing to the fact that the said tube may be bent into any shape so as to accommodate itself to that of the carriage, and that naturally the wire will readily follow the curves of the said tube.

In the accompanying drawings, Figure 1 is a longitudinal section of my brake, the outline of portion of the vehicle being suggested by dotted lines. Fig. 2 is a sectional side view of the worm-gearing, the case being in longitudinal section. Fig. 3 is a top view of the said gear, the case being there shown in horizontal section; and Fig. 4 shows the method of connecting the wire cord and brake-lever with the chamber or socket inclosing the spiral spring, which is shown in section.

The case $a$, arranged underneath the driver's box or seat, contains the worm $b$, on whose shaft $b'$ the crank-handle $c$ is fitted. It also contains the wheel $d$, gearing with the worm $b$ and secured to shaft $d'$, upon which is also mounted the barrel $e$, whereon the cord $f$ is wound. This cord is inclosed in tube $g$, which is attached to the body of the vehicle by means of staples or holdfasts of any suitable description.

Tube $g$ at one end terminates in the socket or chamber $h$, wherein the spiral spring $k$ is contained. Spring $k$ meets and acts upon a collar $m$, provided upon the rod $l$, one of the ends of which is provided with or bent into the shape of a hook $l'$, engaging a pin $i$ at the end of the cord, and thereby effecting the connection between the said rod and cord, while the opposite end $l^2$ of the said rod is forked or yoke-shaped, so as to engage the brake-lever $n$.

I claim—

1. The combination, with the body of a vehicle, of a brake-shoe, a fulcrumed lever attached to said shoe, a tube located within and conforming to the body of the vehicle, a socket connected with said tube, a drum located within the body of the vehicle and provided with a gear-wheel meshing with a worm mounted on a rod provided with a crank, a link located in said socket, with a bifurcated extremity attached to said brake-lever, a collar mounted on said bifurcated link, a spring interposed between said collar and socket, and a cord attached to said link and adapted to be wound on or off of said drum, substantially as and for the purposes set forth.

2. The combination, with the body of a vehicle, of a brake lever and shoe, a drum located within the body of the vehicle, provided with a worm-wheel, a rod provided with a crank and worm, a tube having an enlarged extremity, and said tube located within and conforming to the body of the vehicle, a link located in the enlarged portion of said tube and attached to said brake-lever, a collar attached to said link, a spiral spring interposed between said collar and the enlarged portion of said tube, and a cord attached to said link and adapted to be wound on or off of said drum, substantially as and for the purposes set forth.

3. The combination, with a vehicle-body, a brake-lever, and a shoe, of a tube located within and conforming to the vehicle-body, a drum and worm-wheel located in the vehicle-body, a rod provided with a crank, a worm, a cord passing through said tube and attached to said brake-lever and drum, a collar, and a spiral spring, substantially as and for the purposes set forth.

In testimony whereof I have hereunto set my hand in presence of two witnesses.

ADOLF KRETZSCHMAR.

Witnesses:
RUD. SCHMIDT,
PAUL DRUCKMÜLLER.